United States Patent [19]

Bradler

[11] 4,323,831
[45] Apr. 6, 1982

[54] COMMUTATOR MOTOR USEFUL FOR DRIVING AUTOMATIC WASHERS

[75] Inventor: Peter Bradler, Würzburg, Fed. Rep. of Germany

[73] Assignee: Siemens Aktiengesellschaft, Berlin and Munich, Fed. Rep. of Germany

[21] Appl. No.: 77,654

[22] Filed: Sep. 21, 1979

[30] Foreign Application Priority Data

Sep. 28, 1978 [DE] Fed. Rep. of Germany ....... 2842377

[51] Int. Cl.³ .................... H02K 23/64; H02P 7/36
[52] U.S. Cl. .................................. 318/245; 318/244; 318/733; 318/738
[58] Field of Search ................ 318/733, 738, 244, 245

[56] References Cited
U.S. PATENT DOCUMENTS 4,271,380  6/1981  Bradler et al. ...................... 318/738

FOREIGN PATENT DOCUMENTS 2530294  1/1977  Fed. Rep. of Germany .

Primary Examiner—J. V. Truhe
Assistant Examiner—Eugene S. Indyk
Attorney, Agent, or Firm—Kenyon & Kenyon

[57] ABSTRACT

A commutator motor can be set to different speeds by changing the external circuit connections between the single phase AC supply line and the stator field winding. The field winding is distributed in slots over at least part of the circumference of the stator bore and the field winding connection is switched, when going from a lower to a higher speed, in such a way that the axis of the stator field is rotated in the direction of rotation of the motor. For improved performance, the number of excitation turns may also be changed, simultaneously with the rotation of the field axis. The motor is particularly useful for automatic washing machine drives having a universal motor.

5 Claims, 4 Drawing Figures

COMMUTATOR MOTOR USEFUL FOR DRIVING AUTOMATIC WASHERS

BACKGROUND OF THE INVENTION

1. Field of the Invention

This invention relates to a commutator motor useful in "two-motor" drives which operate at two speeds. More particularly it relates to such motors in which speed change is brought about by changes in connections to the stator field winding.

2. Description of the Prior Art

Various means for setting different speeds in small commutator motors are known, such as: electronic control by means of phase gating via a series-connected Triac, shunting a resistor across the armature; or changing the exciting field by means of a field tap or a series-connected diode. Ordinarily, such commutator motors are equipped with discrete, salient poles, around which the field winding is wound. When speed adjustment is made by means of a tapped field, there is the disadvantage, especially when two distinctly different speeds are to be obtained, that the copper of the stator is poorly utilized in high speed operation and that good commutation conditions are not achievable at all speed levels.

It is, therefore, an object of the present invention to obtain, in a commutator motor in which different operating speeds can be set by means of simple external circuit connections between a single phase AC supply line and the stator field winding, the largest possible spread between the lowest and the highest settable speed levels, especially with loads which are equal at both speed levels, or which are lower in the lower speed stage, as is usually required in an automatic washing machine having two different spinning speeds.

SUMMARY OF THE INVENTION

The solution of the problem set forth above is provided by the present invention, in a commutator motor of the type mentioned at the outset, by means of a field winding which is distributed in slots over part of the circumference of the stator bore and which is switched, when going from a higher to a lower speed, in such a way that the axis of the stator field is moved in the direction of rotation of the motor.

It is possible in the commutator motor of the invention, by switching the connection of the field windings in a simple way, to achieve an effect which is equivalent to shifting the brush axis in the direction which would produce an increase in speed, even though the brush axis itself is maintained stationary. At the same time, a simple design and good utilization of the copper in the field winding are achieved. An embodiment of the invention which is particularly advantageous with respect to good commutation conditions and a large spread of speeds provides for changing the external circuit connections in such a way that, when operating at a higher speed, current flows through only a portion of the field winding which is fully connected to the single phase AC supply line when operating at a lower speed. This results in better copper utilization at high speeds, compared to the known, pure field tapping in a commutator motor equipped with concentrated poles. It also results in an improvement in commutation at the highest, as well as at the lowest speed levels. Ordinarily, a designer would attempt only to obtain the best possible commutation at the highest speed stage levels.

According to the invention, also, at least two spinning speeds can be set by rotation of the field axis alone or by changing the number of turns and simultaneous rotation of the field axis.

DETAILED DESCRIPTION OF THE INVENTION

Figure 1:
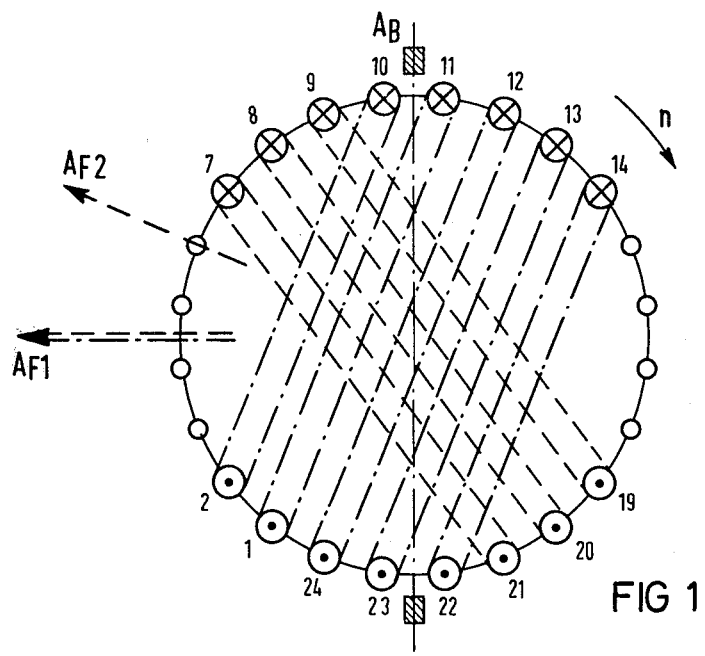
FIG. 1 is a schematic view, in cross-section, of a stator stack having 24 slots, in a first circuit connection of the stator of a two motor drive for an automatic washing machine, which is adapted for induction motor use, when washing, and as a two-pole commutator series motor, when spinning.

FIG. 1 is a view, in cross-section, of the stator stack of a two-motor automatic washing machine drive, which operates as an induction motor, when washing, and as a two-pole commutator motor, for spinning, and in which the spinning speeds can be set by changing the number of turns of the stator field winding and by simultaneous rotation of the axis of the stator field, both being accomplished in one stator.

The circumference of the bore of the stator lamination stack has 24 uniformly distributed slots. The stator winding of the two-phase induction motor (main phase and auxiliary phase), not detailed in the drawing, is uniformly distributed over all slots 1 to 24, along the circumference of the bore. The field winding of the two-pole commutator motor is arranged, along with portions of the induction motor stator winding, in successive slots 7 to 14, on the upper part of the stator bore, and in slots 19 to 24, 1 and 2, on the opposite, lower part of the stator bore. For this purpose, the slots just named each have a larger slot cross section than the remaining slots which are not occupied by the commutator motor field winding. The fixed brush axis is assumed to be $A_B$ in both FIGS. 1 and 2, and the direction of rotation of the motor is assumed to be clockwise as shown by the arrow n.

In the illustrative example of FIG. 1, different stator field axis orientations $A_{F1}$ and $A_{F2}$ are shown for a low and a high speed operating level; they are the result of the external circuit connection and arrangement of the stator field winding. The commutator motor field winding is so arranged and so connected to the single phase AC supply line, that, when all field windings are connected and the direction of the magnetic field of the field winding is assumed to be that of FIG. 1, the position of the resultant field axis shown as $AF_1$ is obtained. From the foregoing, it will be seen that current is flowing away from the viewer in coil sides 7 to 14 in the upper part of the stator bore of FIG. 1 and towards the viewer, in corresponding coil sides 19 to 24, 1 and 2 in the lower part of the stator bore, as indicated by the coil head connection shown as tails or heads of arrows, respectively, in the corresponding coil sides.

When operating at the high speed level, only coil sides 10, 11, 12, 13, 14, in the upper part of the stator bore, and coil sides 2, 1, 24, 23, 22, in the lower part of the stator bore, are connected to the single phase AC supply line of FIG. 1, reducing the number of stator turns. This results, given the same number of conductors in the current carrying slots, in a rotation of the stator field axis from position $A_{F1}$ into position $A_{F2}$, whereby better commutation due to matched compensation of the current reversal voltage as well as an increase of the speed are obtained. In going from higher to lower speed operation, the external connection of the stator field winding in the opposite direction from the magnetic field corresponding to the stator field axis $A_{F2}$, is chosen, e.g., that connection which corresponds to stator field axis $A_{F1}$.

In order to obtain good compensation of the current reversal voltage in low speed operation, it is advantageous to arrange and connect the entire field winding of the commutator motor in such a manner that the field axis $A_{F1}$ is rotated, in the direction of improved compensation of the current reversal voltage, not necessarily perpendicularly, but, by a certain angle, relative to the brush axis $A_B$.

Figure 2:
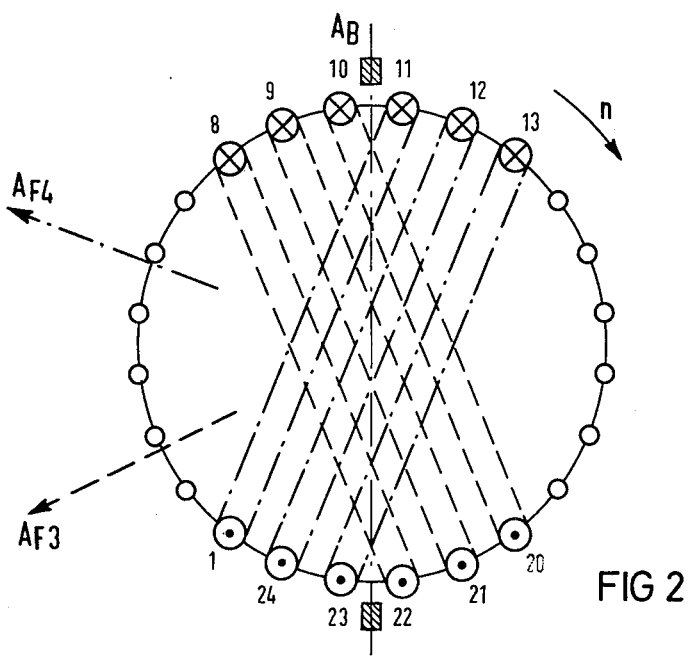
FIG. 2 is a schematic view, in cross section, of a stator stack having 24 slots, showing a second circuit connection of the stator field winding.

FIG. 2 shows a way of changing of the external circuit connection of a field winding arranged in slots 8, 9, 10, 11, 13 and 20, 21, 22, 23, 24, 1 of the commutator motor so that, with the same excitation, a stator field axis $A_{F3}$ is obtained for low speed operation and a stator field axis $A_{F4}$, for the higher speed. To this end, coils formed of coil sides 11, 12, 13, are combined with coil sides 1, 24, 23 and coils formed with coil sides 8, 9, 10 are combined with coil sides 22, 21, 20. In low speed operation, only coils 8, 22 and 9, 21 and 10, 20, carry current; in the high speed operation only coils 11, 1 and 12, 24 and 13, 23, carry current. Thus, both speed levels have the same level of stator field excitation, but the stator field axis is shifted in the direction of rotation, when going from the lower to the higher speed stage. When going from the higher to the lower speed stage, the external circuit connection is changed to produce the reverse effect.

Assuming the same number of conductors in the wound slots and an immediately succeding position of slots carrying current in the same direction, we have for the angle of rotation $\alpha d$ of the stator field axis of two pole motors:

$$\alpha d = [\pi(N_n - N_h)/N_1]$$

where:
$N_1$ = the number of stator slots
$N_n$ = the number of slots wound for the low speed stage
$N_h$ = the number of slots wound for the high speed stage.

The number of conductors in the coils for high speed operation can, of course, differ from the number of conductors in the remaining coils of the commutator winding. The rotation of the stator field axis will be smaller for smaller numbers of conductors in the remaining coils and larger for larger numbers of conductors. Likewise, it is not absolutely necessary for the coil sides carrying current in the same direction to be located in immediately adjacent slots. In any case, however, a change in speed, and, possibly, compensation of the current reversal voltage and, thereby, improved commutation can be achieved by the change in the position of the field axis.

Figure 3:
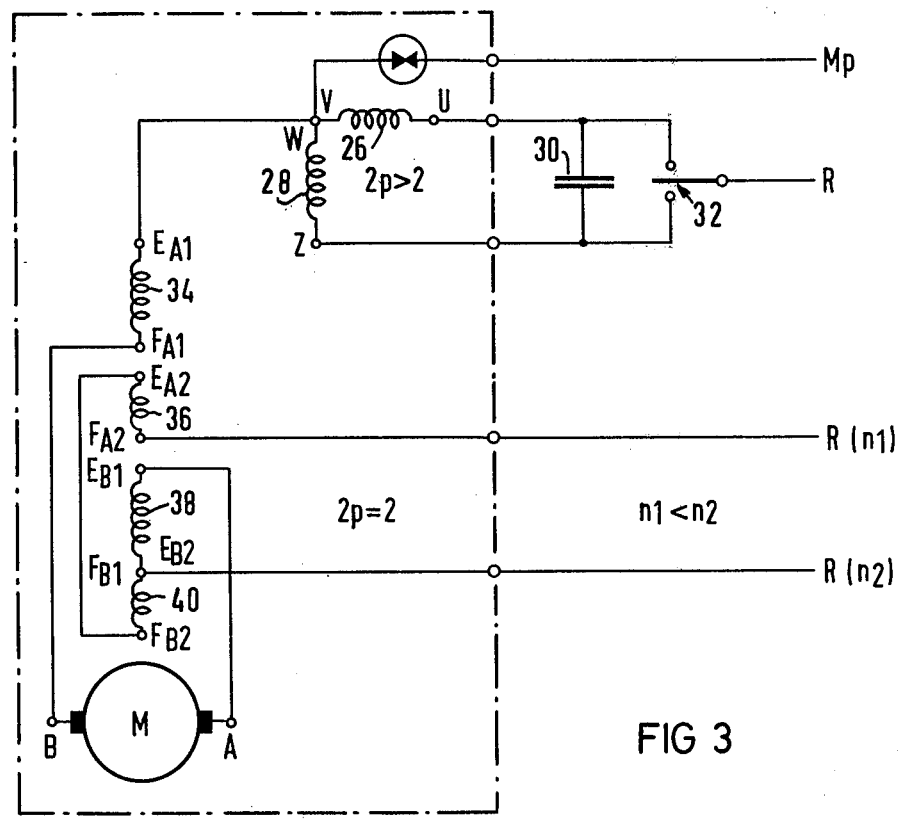
FIG. 3 is a schematic diagram of the circuit for a two-motor automatic washing machine having a stator field winding of a series commutator motor which uses the switching connection of FIG. 1.

FIG. 3 shows the circuit diagram of a two motor drive in which the number of turns in the exciting winding is changed, using the connection of FIG. 1, to rotate the excitation field axis. The single phase AC supply line R, $M_p$ is connected, in washing operation, to the two-phase induction motor winding which consists of the main and the auxilliary phase windings 26 and 28, with capacitor 30, the phase winding in use being connected via a direction reversing switch 32. In spinning operation, the universal motor operates as a single-phase series motor, having an exciter winding in the stator which can be changed by changing the external circuit connection to either lead $R(n_1)$ or lead line $R(n_2)$ in the direction of different numbers of field turns, yielding different excitation field axes.

The entire stator field winding is subdivided, for reasons not related to the invention and so not explained here, into a first winding part 34 connected between the other power supply lead $M_p$ and terminal B, the first brush of the commutator, and second winding parts 36, 38 and 40 connected between the switchable lines $R(n_1)$ and $R(n_2)$ and the second, opposite brush of the commutator (terminal A). As can be seen immediately, by comparison with FIG. 1, a larger stator field excitation and, thereby, a lower speed $n_1$ is obtained when power is connected at $R(n_1)$ to include field winding terminal $F_{A2}$, and add field winding parts 36 and 40 into the circuit, than when the line R is connected at $R(n_2)$ to the field winding terminal $F_{B1}$. In the latter case, the field winding parts 36 and 40 do not carry current and the speed is increased to a value $n_2$ due to the reduced excitation.

Figure 4:
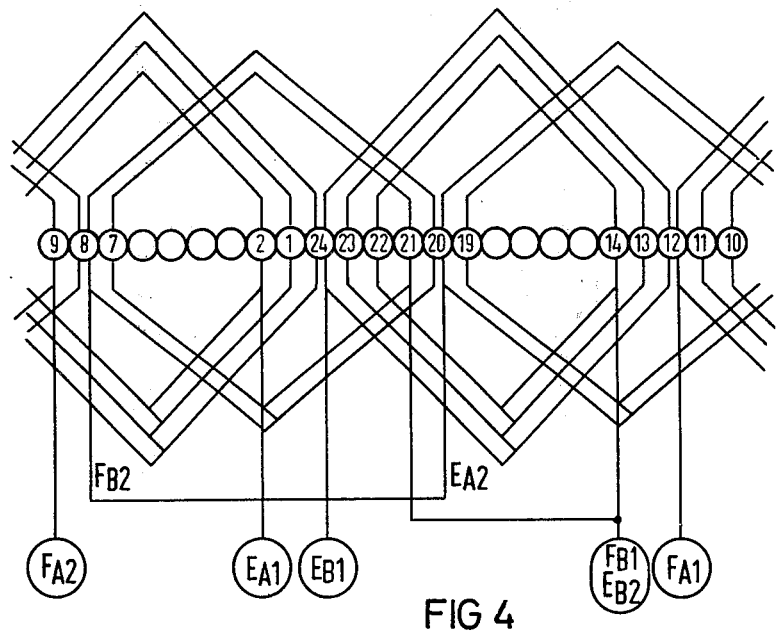
FIG. 4 is the winding plan for the stator field winding of FIG. 1 or FIG. 3.

FIG. 4 shows a winding plan for a stator field winding for use in the drive shown in FIG. 3 and which has the number of turns in the stator and the stator field axis position as shown in FIG. 1 for the two operating speeds. For reasons of winding technique (symmetrical coil head) and other reasons which need not be discussed here, the coil which has coil sides in slot 24 and in slot 12 of the stator field winding of the series commutator motor, is divided up in such a manner that two coil sides, each having one half the number of conductors, are arranged in each of the slots 24 and 12.

What is claimed is:

1. A stator for a commutator motor useful for driving automatic washing machines, which is operable at different speeds by changing the external connections between an AC single-phase supply and a stator field winding to change the stator field, comprising:
   a stator bore containing slots around its circumference;
   a stator field winding having at least first and second parts distributed in said slots around at least a portion of the circumference, each winding part positioned to produce a field having a different axis; and
   means for changing connections to the parts of the stator field winding so that, when going from a low speed to a high speed, the axis of the stator field is rotated in the direction of rotation of the motor.

2. A stator for a commutator motor according to claim 1 wherein the means for changing connections comprises means for coupling the first and second winding parts to the AC supply line for operation at low speed and one winding part to the AC supply line for operation at high speed.

3. In a motor adapted for connection to a single-phase AC supply line and adapted to operate either as an induction motor or as a two-pole commutator motor, the motor having one rotor and one stator, the stator carrying an induction winding and a stator field winding, the improvement comprising:

the stator comprising:

a stator bore comprising slots around its circumference;

an induction motor winding in the slots;

a stator field winding comprising a plurality of turns distributed in slots around at least part of the stator bore, the stator field winding having at least two portions, each portion adapted to produce a stator field having a different axis than the other; and means for connecting different portions of the field winding to the AC supply line to rotate the axis of the stator field to change the speed of the motor.

4. The commutator motor of claim 3 in which each portion of the field winding comprises different numbers of winding turns.

5. The commutator motor of any one of claim 3 or claim 4 in which one portion of the stator field winding comprises the full stator field winding and is used for producing a low speed, and a second portion of the field winding comprises part of the stator field winding, and is used for producing a high speed.

* * * * *